UNITED STATES PATENT OFFICE.

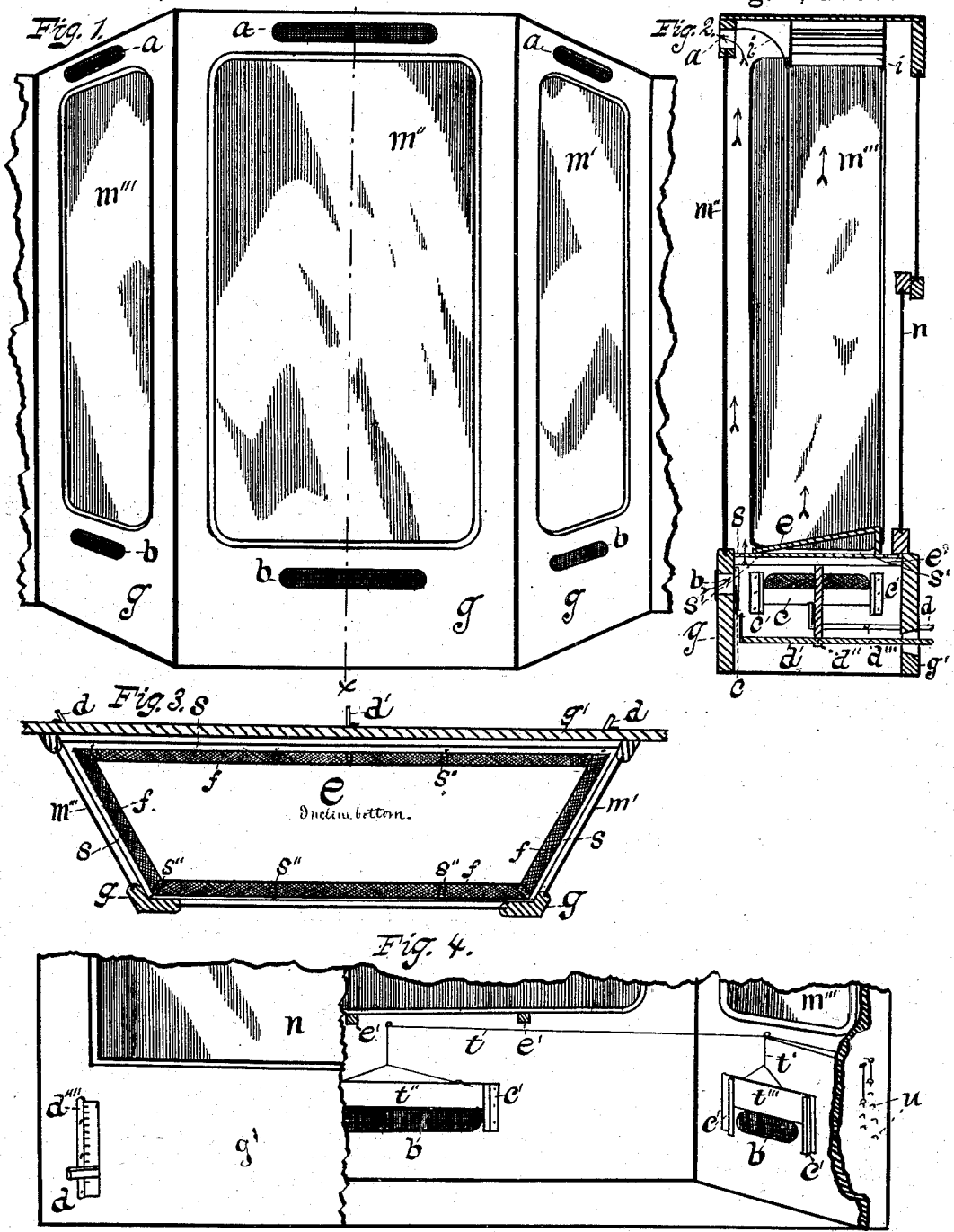

HERMAN HART, OF MUNCIE, INDIANA, ASSIGNOR TO SARAH HART, OF SAME PLACE.

VENTILATING WINDOWS.

SPECIFICATION forming part of Letters Patent No. 261,921, dated August 1, 1882.

Application filed April 1, 1882. (No model.)

*To all whom it may concern:*

Be it known that I, HERMAN HART, a citizen of the United States, residing at Muncie, in the county of Delaware and State of Indiana, have invented a new and useful Method of Ventilating Windows, of which the following is a specification.

My invention relates to improvements in ventilating show-windows, or that class of windows which are made double; and the objects of my invention are, first, to ventilate show-windows by passing a current of air through screened openings in the bottom of the window, which are provided with a sliding regulator, and to pass the air out at the top of the window through screened openings, over which is placed a deflector for increasing the draft or suction; second, to facilitate the opening and closing of the screened openings. I attain these objects by the mechanism illustrated in the accompanying drawings, in which—

Figure 1 is a front elevation of a show-window. Fig. 2 is a vertical section of the same. Fig. 3 is a cross-section of the bottom of Fig. 1, and Fig. 4 is a detail view.

Similar letters refer to similar parts throughout the several views.

An elongated slot or opening, $b$, is made at the bottom of the frame $g$, below the glass $m'$ $m''$ $m'''$. (See Fig. 1.) Over these openings is placed a fine-wire screen. On the inside of the frame $g$, and at each end of the openings, are secured the cleats $c'$. (Shown in Figs. 2 and 4.) Under the inner edge of the said cleats the ends of the slides $c$, $t''$, and $t'''$ are secured just tight enough to allow them to be easily moved up and down. To the under side of the slides $c$ is pivoted the end of the levers $d$ $d'$, the center of said levers working on the pivots $d''$ $d'''$, as shown in Fig. 2. A slot is cut in the inside of frame $g'$, to one side of which is secured a metallic notched strip, $d''''$. The ends of the levers $d$ $d'$ are held in one of the notches, as shown in Fig. 4. Just below the lower edge of the glass the cross-pieces $e'$ are secured. The bottom $s'$ is attached to the upper side of the said bars, as shown in Fig. 2. This bottom has a small frame, $s$, placed around it, leaving a narrow space between the said frame and the edge of the bottom, the frame being held away from the bottom by the blocks $s''$. (Shown in Fig. 3.) Over the aforesaid space a strip of screening, $f$, is secured, as shown in Fig. 3. On the said bottom is placed the incline bottom $e$, as shown in Fig. 2. On this bottom are placed the articles to be exhibited in the window. In the top of the frame $g$ are cut elongated openings $a$, similar to those in the lower part of the said frame, heretofore described, and over these openings is placed a screening, as heretofore described. A deflector, $i$, is placed over these openings, as shown in Fig. 2, curving outward and downward from the said holes $a$, so as to cause a suction or draft up alongside the glass, as indicated by the arrows in Fig. 2. The draft through the window is regulated by opening and closing the inlets $b$. This may be done by raising up on the levers $d'$ $d'$ or by pulling down on the cords $t$ $t'$, which are attached to the slides $t''$ and $t'''$, as shown in Fig. 4. The ends of these cords or wires are hooked in the hooks $u$, as shown.

An incline bottom may be placed under the one shown in Fig. 2, one edge just below the openings $g$ and the other elevated back to cause a greater draft.

Having thus described my invention, I claim—

1. The inlets $b$, outlets $a$, deflectors $i$, frame $s$, blocks $s''$, screens $f$, bottom $s'$, cleats $c'$, slides $c$, and mechanism for operating said slides, in combination with the frame $g$ and glass $m'$ $m''$ $m'''$, as set forth.

2. In a show-window, the screened openings $b$, provided with slides $t''$ $t'''$, which are raised and lowered by the cords $t$ $t'$, one end of each being attached to the said slides and the other to the hooks $u$ at one corner of the frame $g$.

HERMAN HART.

Witnesses:
G. G. ADAMSON,
L. LEON.